Aug. 20, 1935.  J. S. PECKER  2,011,869
COOKING, HEATING AND STERILIZING DEVICE
Filed Aug. 5, 1933  3 Sheets-Sheet 1
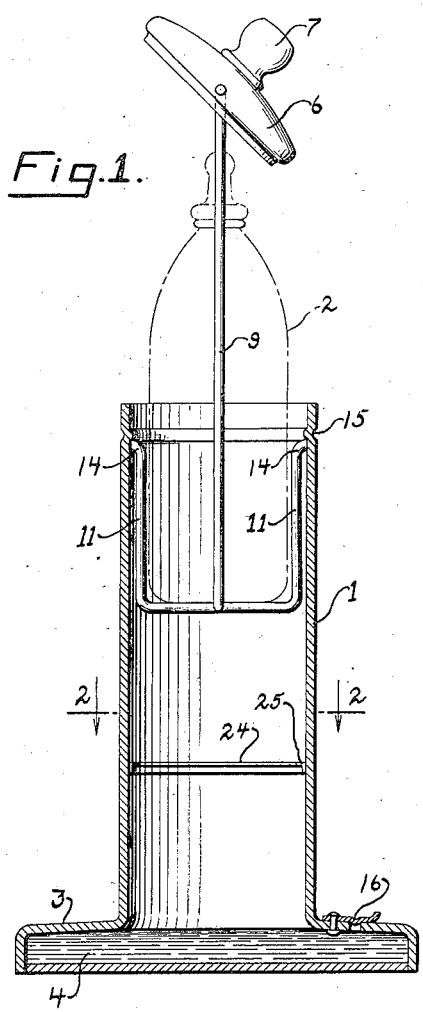
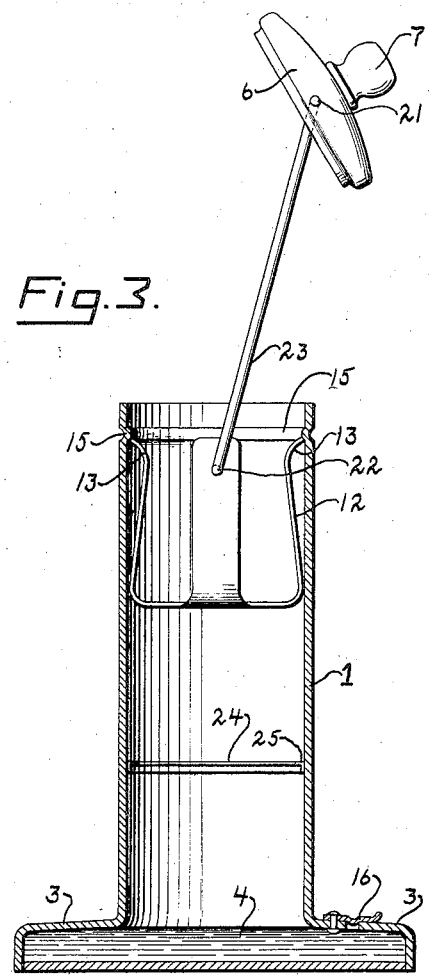
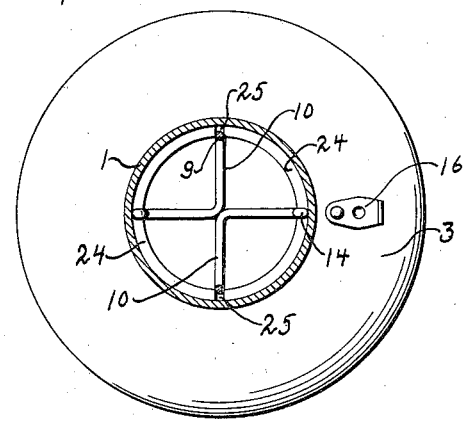
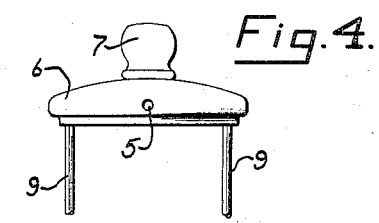
INVENTOR
Joseph S. Pecker
BY Louis Necho
ATTORNEY

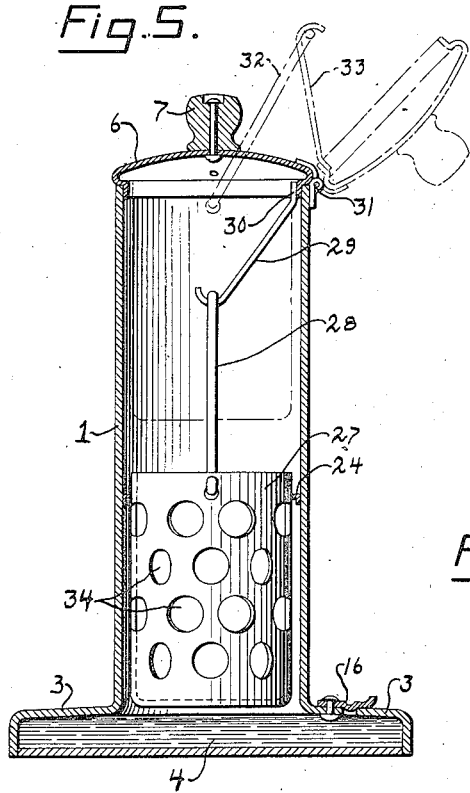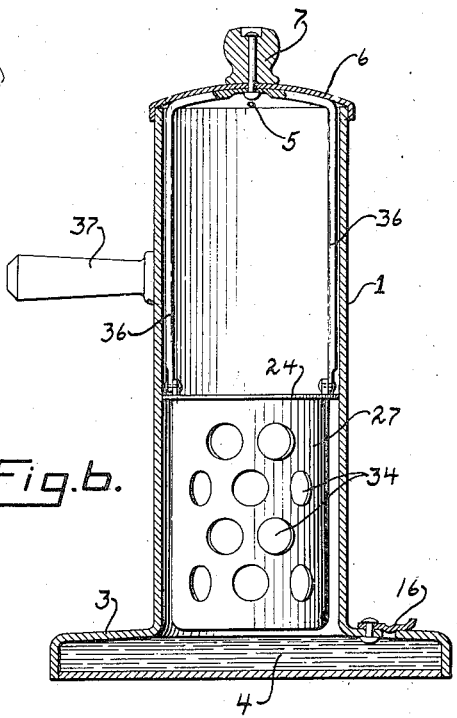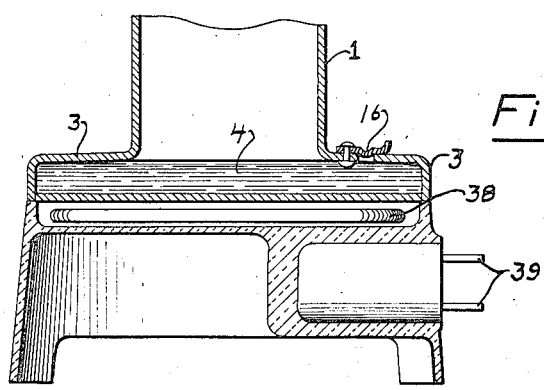

Aug. 20, 1935. J. S. PECKER 2,011,869
COOKING, HEATING AND STERILIZING DEVICE
Filed Aug. 5, 1933 3 Sheets-Sheet 3

INVENTOR
Joseph S. Pecker
BY Louis Necho
ATTORNEY

Patented Aug. 20, 1935

2,011,869

UNITED STATES PATENT OFFICE 2,011,869

COOKING, HEATING, AND STERILIZING DEVICE

Joseph S. Pecker, Arden, Del., assignor to Research and Manufacturing Corporation, Philadelphia, Pa., a corporation of Delaware Application August 5, 1933, Serial No. 683,824

2 Claims. (Cl. 99—18)

My invention relates to a new and useful cooking, heating and sterilizing device and it relates more particularly to a heating and sterilizing device especially adapted for heating and sterilizing containers, such as babies' milk bottles and the like, to sterilize such containers and to warm or heat the contents thereof prior to use or dispensation.

My invention still further relates to a device of this general character which is highly expeditious in its operation, that is, one in or by which a bottle or the like can be heated and/or sterilized in a minimum of time and at minimum consumption of fuel or other heating medium.

My invention still further relates to a device of this general character which is free of all danger of breakage of a bottle or other container heated therein due to expansion and contraction, since my novel device precludes the direct contact of the bottle being heated and sterilized with the source of heat or anything in contact with the source of heat, thus achieving general and gradual heating and sterilization over the entire surface of the bottle.

My invention still further relates to a device of this character which is also adapted for cooking or preparing various items of food, the cooking of which can be accomplished through the medium of heat directly or indirectly applied.

My invention still further relates to a device of this character, the construction of which is calculated to vouchsafe ease of operation and safety against danger of scaling during removal of the heated and sterilized bottle or other container.

My invention still further relates to a device of this general character which in addition to being adapted for use in sterilizing and heating in the manner above set forth is also adapted for use in the cooking or preparation of food by the steaming process.

My invention still further relates to a heating and sterilizing device of the general character described in which the means for supporting the object to be heated, cooked or sterilized, are preferably made of non-heat-conducting materials further to protect against exposure of such object the undue and sudden extremes of heat.

My invention still further relates to a heating, sterilizing and cooking device which is preferably provided with a heating element embodied therein, such as an electric heating unit, or the like, to obviate the necessity for external sources of heat.

My invention still further relates to a device of this character in which means is provided to automatically prelimit the amount of water introduced into the steam generating chamber to obviate the necessity for particular attention on the part of the user.

My invention still further relates to a device of this character which is provided with means for controlling or regulating the diffusion of steam in order to insure uniform temperature throughout the device and to guard against the undue overheating of one portion or the other of the device or of the object being heated or cooked or sterilized.

My invention still further relates to a device of this character which is inexpensive to produce and easy to operate.

In the accompanying drawings:

Fig. 1 represents a vertical sectional view of a heating, sterilizing and cooking device embodying my invention, shown in use for heating and sterilizing a baby's milk bottle.

Fig. 2 represents a section on line 2—2 of Fig. 1.

Fig. 3 represents a view similar to Fig. 1 showing a modified construction.

Fig. 4 represents a fragmentary view and side elevation of the covers of the devices shown in Figs. 1 and 3 taken at right angles showing a vent in said covers.

Fig. 5 represents a view similar to Fig. 1 showing a further modified construction.

Fig. 6 represents a view similar to Fig. 1 showing a further modified form of my invention.

Fig. 7 represents a fragmentary view of the bottom portion of any of the devices illustrated in Figs. 1, 3, 5 and 6 illustrating the application to the device of a heating unit.

Figure 8:
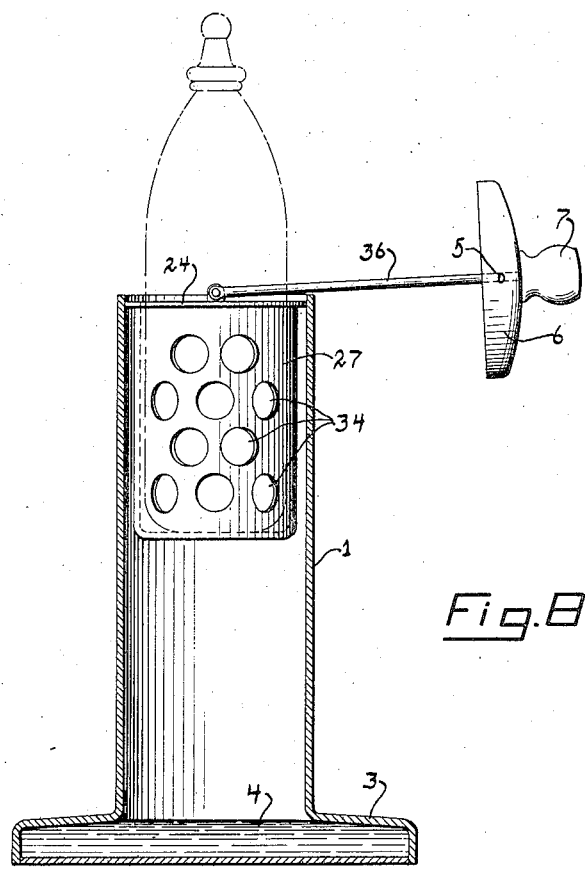
Fig. 8 represents a side elevation of Fig. 6 with the device shown in the open position permitting the withdrawal of the milk bottle.

Referring to the drawings, in which like reference characters indicate like parts, I designates a casing which in the present instance is shown as tubular or cylindrical, for use in connection with a baby's milk bottle 2, it being understood that the exact configuration of the casing I may be changed to suit various requirements. At the bottom of the casing I is formed the well 3 which is relatively large in area and shallow in depth, as seen in Figs. 1, 3, 5, 6 and 7, said well being adapted to contain water 4, which, when exposed to a source of heat, will evaporate to fill the casing I with steam which surrounds the bottle 2, thereby sterilizing the outer surface of the bottle and nipple and serving to warm or heat the contents of the bottle as may be desired, the excess steam being permitted to escape through the vent 5 in the lid or cover 6. As will be seen from the drawings the cover 6 is detachable from the casing and is constructed to fit within or over the upper rim of the casing in any suitable manner, said cover being also provided with a knob or handle 7 of heat-insulating material. In order to prevent the bottle 2 from coming into direct contact with the bottom of the casing 1, the hot water, or other source of heat, which would tend to break the bottle, due to sudden expansion, I provide a support which is carried by and suspended from the cover 6, and which is adapted to carry or support the bottle 2. The bottle support preferably consists of two arms 9 which are engaged at the upper ends thereof with the cover 6, in any suitable manner which will permit of pivoting or deflecting the cover 6 with respect to the arms 9 in the manner shown. The arms 9 are deflected at their bottom ends to form the horizontal members 10 which form a seat for the bottle 2. The free ends of the horizontal members 10 are bent upwardly to form the arms 11, the outwardly deflected ends 14 of which are adapted to engage the notches 15 in the upper end of the casing 1, to prevent complete withdrawal of the bottle support from the casing 1, when the cover 6 carrying the bottle support is raised in the manner shown in Figs. 1 and 3 to permit withdrawal of the bottle 2. The arms 11 may be of any suitable length or cross section. The well 3 is provided with a valve controlled overflow 16 which is opened when water is introduced into the casing 1 in order to limit the amount of water contained in the well 3 and thus to prevent the level of water 4 in said well from reaching the bottom of the bottle 2. Due to the large area of the well 3 and its relative shallowness, only a small amount of water is employed so that a relatively short period of heating is required to convert the water into steam which will completely envelop the bottle 2, thus sterilizing the nipple 17 thereof and at the same time serving to warm or heat the contents of the bottle. The excess steam formed escapes through the vent 5 in a horizontal direction to prevent scalding of the hands of a person attempting to raise and deflect the cover 6. When it is desired to remove the sterilized and heated bottle 2, the cover 6 is grasped by the knob 7 and raised until the deflected ends 14 of the arms 11 and 12 engage the notches 15 in the neck of the casing 1, whereupon the cover 6 is deflected and the bottle is grasped at a point below the nipple 17 thereof to prevent contamination of the latter. If it is desired to remove the bottle support from within the casing 1, the upper ends of the arms 11 and 12 are compressed to permit the deflected ends 14 thereof to clear the notches 15.

In Fig. 3 is shown a slightly modified form of construction wherein I employ the bottle support 12 having the deflected upper ends 13 for engaging the notches 15 in the casing 1, to prevent accidental withdrawal of the bottle support from the casing 1 but wherein, in lieu of the arms 9, I employ a yoke 23 which is pivoted at 21 to the cover 6 and at 22 to the bottle support 12 which may be of any size or cross section. At a suitable point along the casing 1, I provide a flange 24 which is notched at 25 to permit movement therethrough of the parts constituting the bottle support, the purpose of said flange being to retard the upward travel of the steam generated at the bottom of the casing to insure adequate heating of the bottom portion of the bottle 2 or other object, as with such a baffle the steam tends to rise to the top of the casing, thus heating the top of the bottle much more than the bottom portion thereof.

In Fig. 5, I have shown a modified form of my invention in which I employ a perforated basket 27 for receiving the object to be cooked, heated or sterilized, which basket is pivotally connected to the link 28, which in turn is pivotally connected to another link or arm 29 which is secured at 30 to the cover 6. As shown in dotted lines, in order to raise the basket 27 it is merely necessary to tilt the cover 6 along its hinge 31, whereupon the arms 29 and 30 assume the positions shown at 32 and 33, respectively, thereby raising the container or basket 27 up to render its contents accessible at the top of the casing 1. In this construction, due to the presence of the flange or baffle 24, the steam generated at the bottom of the casing 1 cannot pass into the upper portion of the casing except through the openings 34 in the container 27 thereby insuring the subjection of the contents of the basket 27 to the full force and effect of the steam.

Figure 9:
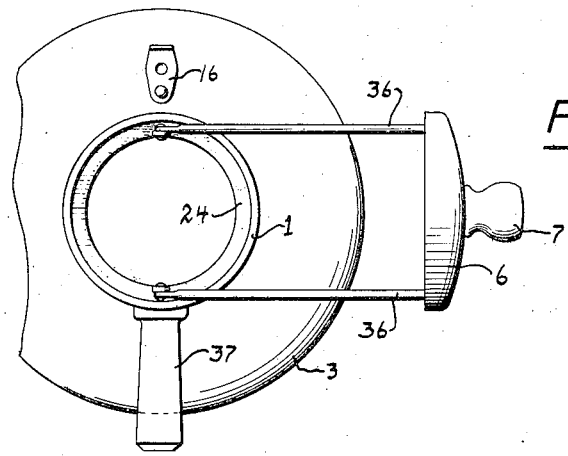
Fig. 9 represents a fragmentary plan view of Fig. 8.

In Fig. 6, I have shown a modification of the device shown in Fig. 5 wherein the basket 27 is pivotally carried by the arms 36 which in turn are carried by the cover 6. In order to remove the contents of the container 27, the cover 6 is lifted as shown in dotted lines, whereupon it can be deflected completely to expose the contents of the basket 27. If desired, the casing can be provided with a handle 37 of a heat insulating material. By referring to Figs. 8 and 9 it will be seen that when the cover 6 and the pivotally connected arms 36 are raised to bring the basket 27 up to the top of the casing 1 the arms 36 are deflected at their pivotal junction with the basket 27 into a position at right angles with the casing 1, whereupon the weight of the cover 6 will counter-balance the basket 27 in its raised position with the upper edge of the casing 1 on which the arms 36 rest acting as a fulcrum. As best seen in Fig. 8, the milk bottle or other object in the basket 27 is thus held up completely accessible and is supported in this upper accessible position by the counter-balancing effect of the cover 6 at the other end of the arms 36 which act as fulcrumed levers.

In Fig. 7, I have illustrated a manner of providing the devices shown in Figs. 1, 3, 5 and 6 with an electric heating unit 38 positioned below the well 3, the device being provided with standard plugs 39 for connection to a conventional socket which is electrically energized from a source of current not shown.

The devices shown in Figs. 5 and 6 are particularly suitable for the sterilization of small objects, such as the nipples of the water bottle 2 shown in Fig. 1, as well as for cooking various items of foods, such as eggs and the like.

It will thus be seen that I have devised a novel heating, cooking and sterilizing device which is efficient in its operation and which is inexpensive to produce. It will further be seen that by my novel device the heating, cooking and sterilization of any desired object can be effected in a very short time, with or without the use of an external source of heat, as may be desired. It will further be seen that my novel heating, sterilizing and cooking device is of an extremely simple construction which is not susceptible to damage or injury and which therefore is not likely to get out of order and therefore needs no maintenance or repair.

It will be understood that the bottle supporting devices, and their suspensions, may, if desired, be made of a heat insulating material, such as fibre, hard rubber and the like. If desired the flange or baffle 24, for retarding the flow of the steam may be positioned on the upper rim or edge of the bottle supporting devices instead of on the inner wall of the casing, as illustrated in Fig. 6.

Having thus described my invention, what I claim as new and desire to secure by Letters Patent is:

1. A baby bottle warming and sterilizing device comprising a relatively narrow elongated casing adapted to enclose a baby bottle, an enlarged relatively shallow water chamber formed at the base of said casing, a basket adapted for vertical movement within said casing, a cover for the top of said casing, and suspension arms pivotally connected at their lower ends to the upper edge of said basket and pivoted at their upper ends to said cover.

2. A baby bottle warming and sterilizing device comprising a relatively narrow cylindrical casing adapted to enclose a baby bottle or the like, an enlarged relatively shallow water chamber formed at the base of said casing, a basket adapted for vertical movement within said casing, a cover for the top of said casing, and suspension arms pivotally connecting said basket to said cover.

JOSEPH S. PECKER.